(No Model.)
W. T. SCHENCK.
SHIELD FOR KNOTTER FINGERS OF BINDERS.
No. 526,463. Patented Sept. 25, 1894.
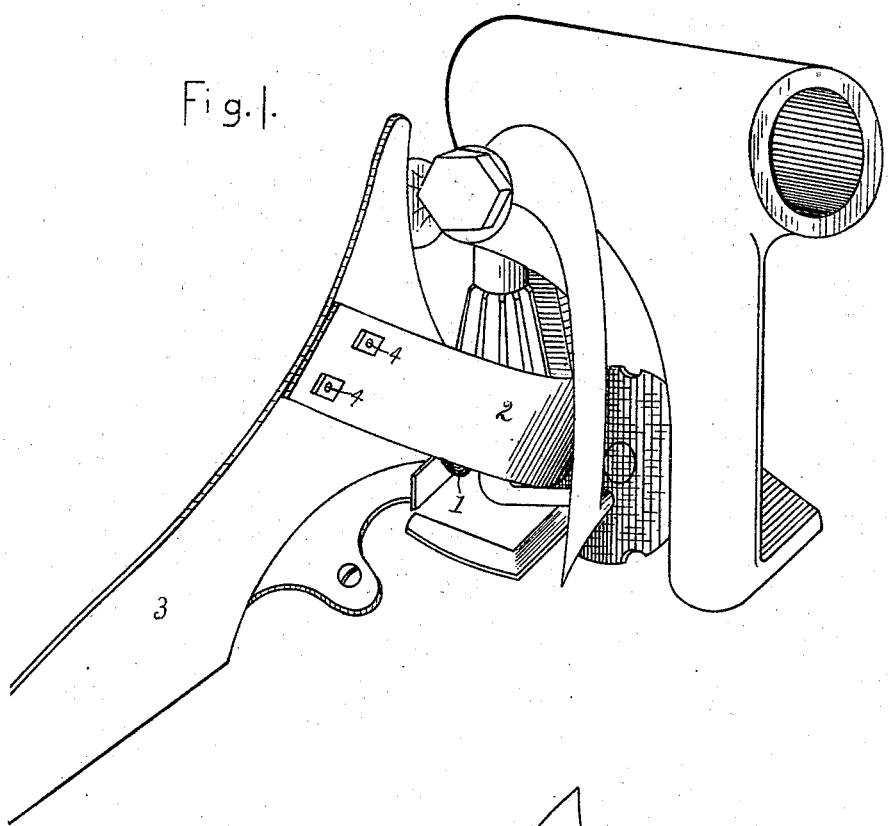
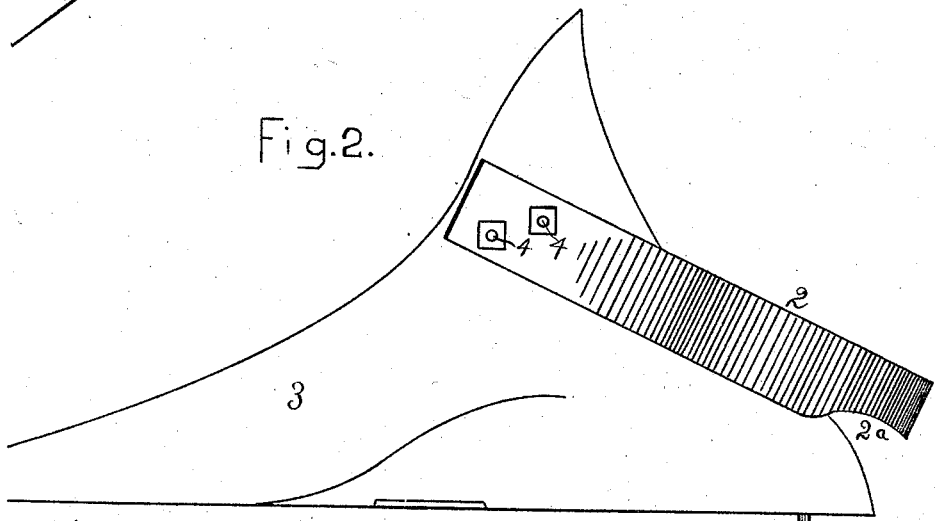
WITNESSES
Helen Graham
William Graham
INVENTOR
William T. Schenck
by his attorney
L. P. Graham

UNITED STATES PATENT OFFICE.

WILLIAM T. SCHENCK, OF MAROA, ILLINOIS.

SHIELD FOR KNOTTER-FINGERS OF BINDERS.

SPECIFICATION forming part of Letters Patent No. 526,463, dated September 25, 1894.

Application filed December 3, 1892. Serial No. 454,019. (No model.)

*To all whom it may concern:*

Be it known that I, WILLIAM T. SCHENCK, of Maroa, in the county of Macon and State of Illinois, have invented certain new and useful Improvements in Shields for the Knotter-Fingers of Binders, of which the following is a specification.

This invention is designed for use on binders in which the knots are tied by a finger having a ball that acts on a cam to move the finger, the object being to prevent the twine from tying around the ball, and also to prevent the accumulation of straw around the knotter finger, and it consists in the shield hereinafter described, the essential feature of which is its position with relation to the path of the ball of the knotter finger.

In the drawings forming part of this specification Figure 1 is a perspective representation of my device as applied to the binder, enough only of the coacting features being shown to make its application and operation apparent. Fig. 2 is an elevation of the shield and the guard casting with which binders are usually supplied, and with which the shield is preferably connected.

The shield 2 is preferably formed of the curved metal strap shown in the drawings, which is, as before stated, preferably connected with guard casting 3 by means of bolts 4, 4, and which is cut away at 2ª to permit the passage of the knife of the binder. In whatever manner the shield is constructed and attached, the essential requirement is that its lower edge shall extend around the knotter finger above the twine, and shall be slightly lower than the path of the center of the ball 1 of the knotter finger. When this is done the twine is effectually prevented from passing above the ball and tying around the finger, and straw is excluded from contact with the finger.

When straw accumulates around the knotter finger it tends to throw the twine out of place, and when the accumulation becomes considerable the twine will tie around the accumulation instead of tying around the bundle.

I do not confine myself to the particular construction shown and described, but,

Having thus described the essential features of my invention, I claim as new and desire to secure by Letters Patent—

1. A shield for the knotter finger of binders, such shield extending around the finger above the path of the twine and having its lower edge lower than the path of the center of the ball of the knotter finger, substantially as described.

2. A shield for the knotter finger of binders, such shield being made of a curved metal strap as 2 cut away at 2ª and extended around the finger above the path of the twine with its lower edge lower than the center of the ball of the knotter finger, substantially as set forth.

In testimony whereof I sign my name in the presence of two subscribing witnesses.

WILLIAM T. SCHENCK.

Witnesses:
JNO. ROGERS,
E. S. MCDONALD.